United States Patent
Schmermund

(10) Patent No.: US 6,293,695 B1
(45) Date of Patent: Sep. 25, 2001

(54) TRIPLE POINT OF WATER CELL

(76) Inventor: George Schmermund, 1660 Marbella Dr., Vista, CA (US) 92083

( * ) Notice: Subject to any disclaimer, the term of this patent is extended or adjusted under 35 U.S.C. 154(b) by 0 days.

(21) Appl. No.: 09/481,072

(22) Filed: Jan. 11, 2000

(51) Int. Cl.$^7$ .................................................. G01K 15/00
(52) U.S. Cl. ...................................................... 374/1; 374/3
(58) Field of Search .............................................. 374/1, 3

(56) References Cited

U.S. PATENT DOCUMENTS

| | | | |
|---|---|---|---|
| 3,216,236 | * 11/1965 | Rohrbach | 374/3 |
| 3,308,646 | * 3/1967 | Singleton | 374/1 |
| 3,348,408 | * 10/1967 | Engborg | 374/2 |
| 3,844,894 | * 10/1974 | Kronick et al. | 435/287.5 |
| 5,219,225 | 6/1993 | Ball | 374/1 |

FOREIGN PATENT DOCUMENTS

2590981-A1 * 6/1987 (FR) ........................................ 374/1

OTHER PUBLICATIONS

The National Bureau of Standards, Heat demonstrations Book 1, Figure 21–1, "Triple Point Cell" (no date).*
Isothermal Technology Ltd, "Jarret Water Triple Point Cell" (no date).*
S. Carlson, "Trackling the triple point", Scientific American, vol. 280, Issue 2, pp. 98–99, Feb. 1999.*
1998–1999 Hart Scientific Temperature Calibration Equipment.

* cited by examiner

Primary Examiner—Diego Gutierrez
Assistant Examiner—Lydia M. De Jesús

(57) ABSTRACT

A triple point cell comprising: 1) An outer vessel and an inner vessel; 2) an elastomeric stopper that fits inside the open end of the outer vessel; the elastomeric stopper has two holes, one through which the inner vessel is tightly fitted, and a second through which unwanted gasses is allowed to escape; 3) water in the volume between the outer and inner vessels. 4) a vent plug for plugging up the second hole after all the unwanted gases has been driven out of the triple point cell by water vapor that has been generated by boiling the water. Triple point is reached by freezing some of the water in the cell, and then letting the ice, water, and water vapor come to thermal equilibrium.

5 Claims, 1 Drawing Sheet

TRIPLE POINT OF WATER CELL

BACKGROUND OF THE INVENTION

A triple point of water is the temperature at which water, water vapor, and ice are in thermal equilibrium. Water triple point cells are used as an ITS-90 primary standard for calibrating thermometers; for this purpose, the triple point of pure water has an assigned value of exactly +0.01 degrees C.

There are commercially-available water triple point cells. A typical such cell sold by Hart Scientific has concentric cylindrical glass vessels. Both the inner and outer vessels are closed at the bottom. At the top, the vessels are joined together, thus sealing off an annular volume between the two cylinders. The annular volume is partially filled with water at the factory, and a vacuum is drawn (also at the factory) such that the remaining of the sealed-off volume is occupied by water vapor. When some of the water is cooled to become ice, there will be water, water vapor and ice inside the cell, and when they come to thermal equilibrium, the triple point is reached.

The Hart water triple point cells are quite expensive (currently they sell for around one thousand dollars each). Because the cells are filled and sealed at the factory. Water in the cells may slosh around during transportation, without air inside to dampen the water motion, a "water hammer" effect is generated, and breakage of the glass by action of water hammer is a common problem.

An object of the present invention is to provide a much less expensive water triple point cell.

Another objective of the invention is to provide a more rugged triple point cell, one that is not so susceptible to breakage during transportation.

SUMMARY OF THE INVENTION

One preferred embodiment of the invention provides a triple point cell comprising: 1) An outer vessel and an inner vessel; 2) an elastomeric stopper that fits inside the open end of the outer vessel; the elastomeric stopper has two holes, one through which the inner vessel is tightly fitted, and a second through which unwanted gasses is allowed to escape; 3) water in the volume between the outer and inner vessels. 4) a vent plug for plugging up the second hole after all the unwanted gases has been driven out of the triple point cell by water vapor that has been generated by boiling the water. Triple point is reached by freezing some of the water in the cell, and then letting the ice, water, and water vapor come to thermal equilibrium.

DETAILED DESCRIPTION OF THE INVENTION

Figure 1:
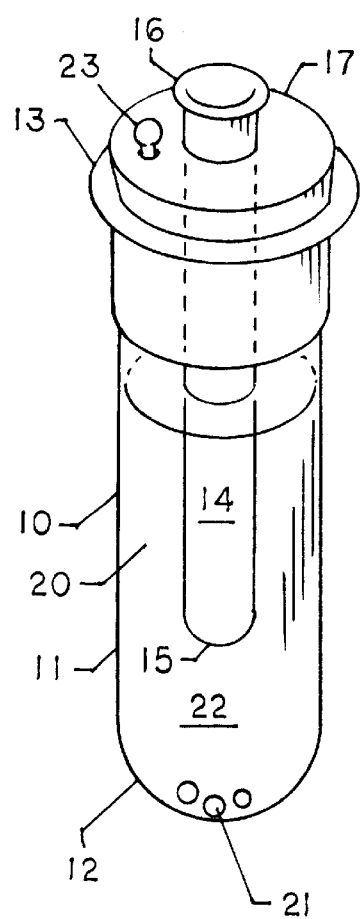
FIG. 1 shows a perspective view of an assembled triple point of water cell which is a preferred embodiment of the invention

FIG. 1 shows an assembled triple point cell 10. It comprises 1) an outer vessel 11, which is closed at one end 12 and open at the other end 13, in one embodiment of the invention, the outer vessel 11 is about 5 cm in diameter and 17 cm long; 2) an inner vessel 14 that is also closed at one end 15 and open at the other end 16, in one embodiment of the invention, the inner vessel 14 is a pyrex test tube; 3) an elastomeric stopper 17 that fits inside the open end 13 of the outer vessel 11, the elastomeric stopper 17 having a central hole 18 (see FIG. 2) through which the inner vessel 14 is inserted; the elastomeric stopper 17 further having a vent hole 19 through which air, dissolved gases and water vapor is allowed to escape.

Figure 2:
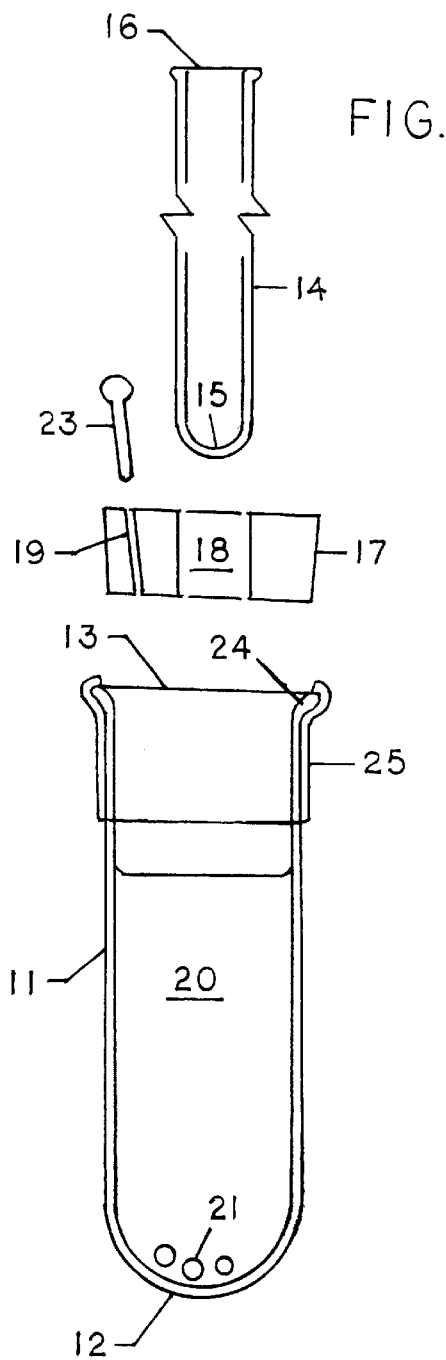
FIG. 2 shows a sectional view of the individual parts that make up the triple point of water cell of FIG. 1.

The individual parts 11–19 are shown unassembled in FIG. 2.

In preparation for use, the triple point cell 10 is first assembled by inserting the inner vessel 14 into the hole 18 of the stopper 17 such that about 1.2 cm sticks out at the open end 16. Vacuum grease may be used to facilitate insertion of the inner vessel 14, but the vacuum grease should be wiped away after insertion.

Water 20 is placed into the outer vessel 11. The quantity of water is such that the water level comes up to about 5 cm below the stopper 17 when the triple point cell 10 is finally assembled. Ideally the water is 100 percent pure. In practice, pure water is very difficult to get, in any case it would be too expensive. Distilled water from grocery stores are acceptable for many applications. When grocery store distilled water is used, the accuracy of the triple point cell is about 0.001 degrees C. (compared to the Hart cells which the manufacturer claims to have an expanded uncertainty of 0.0001 degrees C.)

Optionally, nucleation means such as glass beads 21 are placed at the bottom of the outer vessel with the water to prevent the water from boiling too violently (when the water needs to be boiled).

The stopper is inserted into the open end 13 of the outer vessel 11. A thin layer of vacuum grease may be applied between the stopper 17 and the outer vessel 11 to assure a good tight seal.

Air and dissolved gases in the volume 22 between the inner and outer vessels is removed by boiling the water. Air and dissolved gases are driven out through the vent hole 19 by water vapor. When all the air and dissolved gases has been driven out, the vent hole 19 is plugged by inserting a vent plug 23.

To check if all the air and dissolved gases has been removed, the triple point cell is shaken gently, a sharp "snap" shows that a water hammer effect is working. If not, there may be unwanted gases in the triple point cell and they need to be removed by boiling again.

To reach the triple point, some of the water in the triple point cell must be frozen to become ice. This can be accomplished by placing dry ice (solid carbon dioxide) or liquid nitrogen in the inner vessel until ice formation is seen through the glass. The triple point is reached when the enclosed water, water vapor and ice is in thermal equilibrium.

In FIG. 2 the outer vessel 11 is shown to have an optional flange 24 at its open end 13. The purpose of this flange 24 is to provide additional mechanical strength. Also optionally, a compression band 25 is placed around the outer vessel 11 near its open end 13 to apply compression to the open end 13 and to help prevent flying fragments of glass from causing injuries in case the outer vessel 11 breaks. In the embodiment shown in FIGS. 1 and 2, the compression band is a piece of heat-shrink tubing. The compression acts as a preload against expansion caused by the stopper 17 when it is pushed by atmospheric pressure into the vessel 11 which is under reduced pressure because gases have been driven out by the boiling water.

In the example of a preferred embodiment described above, the vessels 11 and 14 are shown to be substantially cylindrical in shape and have substantially rounded bottoms; the invention is not limited to the sizes and shapes of this preferred embodiment. Scope of the invention is determined by the following claims.

I claim:

1. A triple point cell comprising:

an outer vessel that is closed at one end and open at the other end;

an inner vessel that is also closed at one end and open at the other end;

an elastomeric stopper that fits inside the open end of the outer vessel, said elastomeric stopper having a hole through which the inner vessel is placed; said elastomeric stopper further having a vent hole through which unwanted gasses may escape;

a vent plug for plugging up said vent hole;

thereby enabling air and dissolved gases inside the triple point cell to be driven out through said vent hole by water vapor generated by boiling water inside the triple point cell; once all the air and dissolved gases has been removed, the vent hole is closed by inserting the vent plug.

2. A triple point cell according to claim 1 wherein said open end of said outer vessel is flanged to provide additional strength.

3. A triple point cell according to claim 1 further comprising a compression band around said outer vessel near said open end to apply compression to said open end, and to help prevent flying fragments of glass from causing injuries in case the outer vessel breaks.

4. A triple point cell according to claim 1 further comprising nucleation means located near the closed end of said outer vessel to prevent the water from boiling too violently.

5. A method for generating a temperature at the triple point of water comprising the steps of:

Providing a triple point cell including an outer vessel and an inner vessel placed through a central hole in an elastomeric stopper that fits inside an open end of the outer vessel;

placing water in said outer vessel;

closing said outer vessel with said elastomeric stopper, thereby confining the water to a volume formed between the outer vessel and the inner vessel, said elasteromic stopper further having a vent hole;

boiling said water in said cell to drive out air and dissolved gasses from said volume;

closing said vent hole with a vent plug;

cooling said water until some of it frezes into ice, thereby enabling establishment of an equilibrium among water, water vapor, and ice in the vessel at said temperature at the triple point of water.

\* \* \* \* \*